Figure 1:
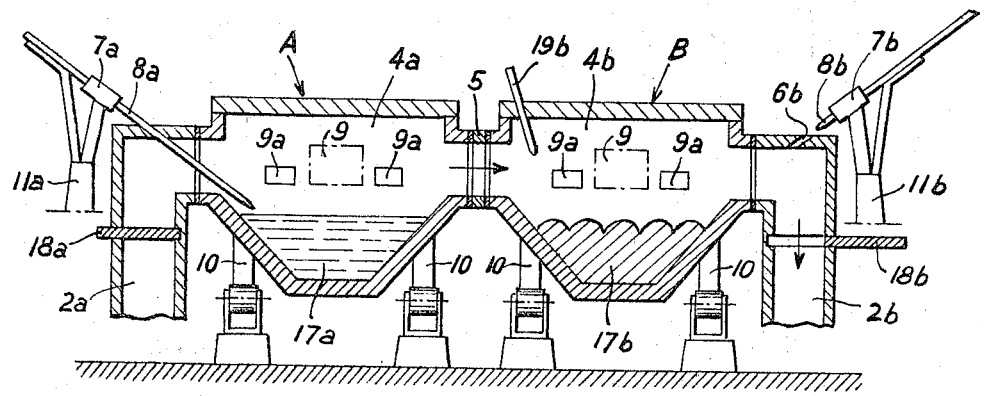

March 14, 1967 F. BARTU 3,309,193
PROCESS OF REFINING IRON
Filed Jan. 26, 1965

INVENTOR
Franz Bartu
BY
ATTORNEYS

United States Patent Office 3,309,193
Patented Mar. 14, 1967

3,309,193
PROCESS OF REFINING IRON
Franz Bartu, 10 Tagerhalde, Kusnacht,
Zurich, Switzerland
Filed Jan. 26, 1965, Ser. No. 428,083
Claims priority, application Austria, Jan. 27, 1964,
A 602/64
2 Claims. (Cl. 75—43)

This invention relates to a process of refining iron with an oxidizing gas.

In recently disclosed processes of making steel, iron is refined with oxygen or oxygen-enriched air in a double furnace, which consists of two hearths or furnaces connected in series by a connecting duct. These two hearths or furnaces may consist of stationary or tilting hearth furnaces or rotary furnaces. In these known processes, the two furnaces are operated in alternation in such a manner that the hot, carbon monoxide-containing gases from one furnace are passed into the other furnace, in which they are burnt with oxygen, air, or oxygen-enriched air to preheat the input placed into the second furnace.

Just as regenerative furnaces, such as open-hearth furnaces, the double furnaces must be reversed to change the direction of flow of the gases. Regenerative furnaces are generally reversed by closing the valve at one end of the furnace and simultaneously opening the valve at the other end of the furnace. Such a mode of operation is not suitable for double furnaces. The most suitable time schedule for the cooperation of the two furnaces of a double furnace is as follows:

During the time in which patching, charging and preheating of the solid input, which may contain beside scrap also solid pig-iron or iron ore, are performed in one furnace (furnace 1), refining and finishing are carried out in the other furnace (furnace 2). Then furnace 2 is tapped and hot metal is simultaneously charged into furnace 1. Refining and finishing are then carried out in furnace 1 and patching, charging and preheating in furnace 2. Thereafter furnace 1 is tapped and furnace 2 is charged with hot metal.

Hence, the hearth of each furnace must be patched after this furnace has been tapped. In order to avoid a loss of time, oxygen blowing is to be carried out immediately after the charging of hot metal into the other furnace. Already at the beginning of the blowing the formation of red smoke begins; a penetration of this red smoke into that furnace in which the hearth is being patched is a severe disturbance of the patching work. The process according to the invention for refining iron or a ferrous charge respectively with an oxidizing gas, i.e. oxygen or mixtures of oxygen and air, in a double furnace of the kind described has as its object to avoid such a disturbance and is characterized in that the carbon monoxide formed in the refining furnace during the initial phase of this refining operation, as long as the preheating furnace is being patched, is burnt in the refining furnace and the resulting waste gases are discharged through the flue of the refining furnace. The oxygen required for burning the carbon monoxide during the time concerned may either be directly introduced into the refining furnace in the form of gaseous oxygen and/or air or may be sucked from the preheating furnace as long as the same is being patched. This second possibility exists because the doors of the preheating furnace are necessarily open during the patching, so that air can enter through these doors. It may be mentioned that the combustion of the carbon monoxide gases in the refining furnace with air sucked in by the preheating furnace is not uneconomical with respect to the utilization of heat because the air is heated by the hot lining of the preheating furnace, and the air rate required for the combustion of carbon monoxide in the refining furnace at the beginning of the blowing therein is not very high, a major part of the oxygen being consumed for oxidizing silicon and manganese, so that the development of carbon monoxide is very small.

In the process according to the invention, the reversing valve of the refining furnace must not be closed until patching has been completed, so that the carbon monoxide can be burnt in the refining furnace and the waste gases discharged directly through the flue of the refining furnace. The reversing valve of the preheating furnace, however, may be opened partially or entirely before. The two reversing operations which are possible will be described hereinafter. In both cases, the reversing valve of the furnace previously used for preheating and now for refining remains open until patching has been terminated:

(a) The reversing valve of the furnace which has previously been used for refining and is now to be used for preheating when it has been patched, is closed.

(b) The reversing valve of the furnace which is to be used for preheating when it has been patched, is opened at least partially at the beginning of the oxygen blowing so that air sucked into the preheating furnace during the patching can be discharged both through the refining furnace and directly through the flue of the preheating furnace.

The invention will be explained more fully with reference to the accompanying drawings, in which the reversing valves are represented by gate valves, for the sake of simplicity. It must be emphasized, however, that other reversing valves or dampers may be used. Besides, the elbow of the flue to be connected to each furnace or hearth may be replaceable or removable, and the flue of the furnace or the free opening of the flue may be closed by a cover, the elbow and the cover forming in this case a reversing valve.

Figure 2:
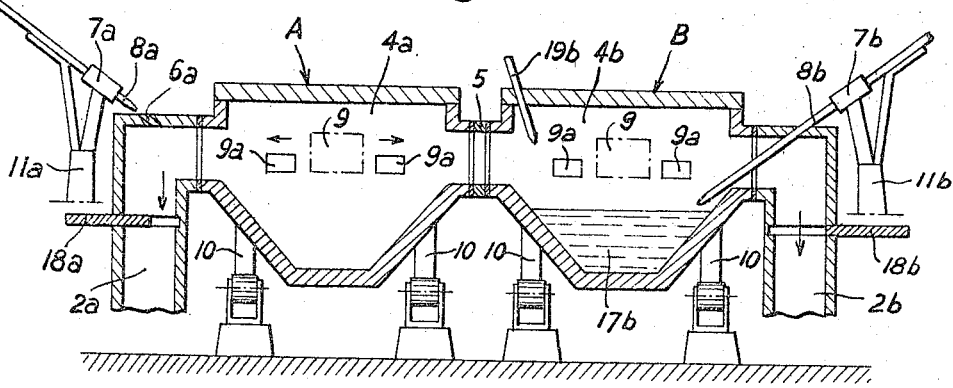
Figure 3:
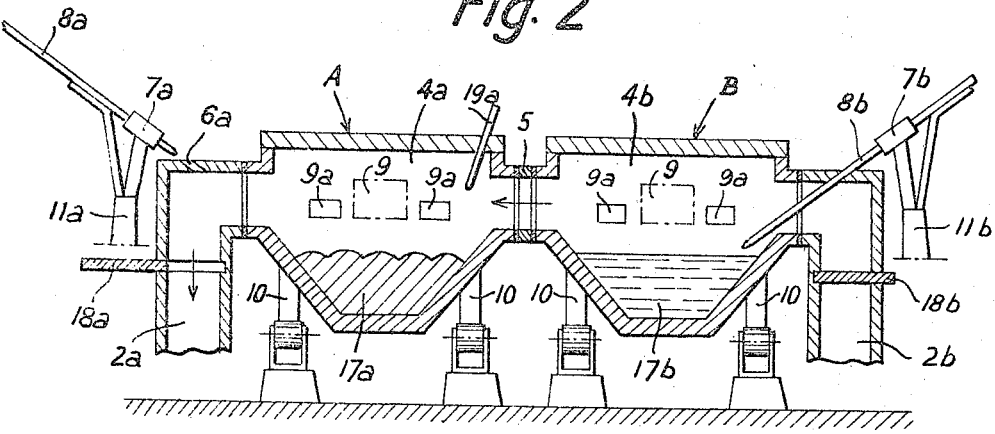

FIGS. 1 to 3 are longitudinal sectional views showing a double furnace which comprises a shut-off type gate valve disposed in the descending portion or elbow of each flue. In FIGS. 1 to 3 the reversing operations are elucidated by showing the positions of the gate valves in the various phases of operation.

The double furnace shown in FIGS. 1 to 3 consists of two furnaces or hearths A and B, in the claims designated as vessels, which are connected by a connecting duct 5. These hearths have hearth chambers $4a$ and $4b$, respectively, each of which is connected to a rectangular flue $2a$ or $2b$. Each of the furnaces A and B is provided at its end with an opening $6a$ or $6b$ for a lance $8a$ or $8b$ for blowing oxygen or oxygen-enriched air onto or into the bath. The opening for the lance which is retracted at a time (that of the right-hand furnace B in FIG. 1) is closed by a cover (not shown in the drawing). The lances $8a$ and $8b$ are arranged slidable in guides $7a$ or $7b$ mounted on supporting stays $11a$ or $11b$.

The two furnaces A and B are provided in usual manner with charging openings 9 and with openings $9a$ affording access for repairs. The furnaces A and B are carried by supports 10. In the case of tilting hearth furnaces, these supports consist of runners, which rest on roller tracks.

Each of the flues $2a$ and $2b$ of the two furnaces A and B accommodates in its descending portion of a shut-off type gate valve $18a$ or $18b$. This valve may be slidable on the outside in a guide and is adjustable, e.g., by means of an actuating rod.

Through the roofs of the two furnaces A and B nozzles $19a$ or $19b$ can be introduced for delivering oxygen, air or oxygen-enriched air for burning carbon monoxide. The nozzles $19a$ and $19b$ are arranged near by the connecting duct 5 and are inclined towards the hearth bottom and the flue of the furnace concerned.

In the phase of operation shown in FIG. 1, in which refining is carried out in the furnace A and the input 17b is preheated in the furnace B by burning therein CO, the lance 8a is extended into the furnace A for the introduction of oxygen or oxygen-enriched air into the bath 17a. At this time, the gate valve 18a in the flue 2a of the furnace A is closed. In the furnace B, the lance 8b is retracted and the gate valve 18b in the flue 2b is opened. For burning CO in furnace B a nozzle 19b is provided, by which oxygen, air or mixtures of oxygen and air are introduced serving as combustion-agent. The corresponding nozzle 19a in furnace A is retracted. The gases flow in the direction of the arrows from furnace A into furnace B and therefrom into the flue 2b.

FIG. 2 shows the phase of operation which succeeds the phase of FIG. 1. Oxygen blowing has begun in furnace B after adding hot metal to the preheated input; furnace A, which has already been tapped, is being patched. Both gate valves 18a and 18b are shown opened in the drawings, so that the air sucked into the furnace A through its opened door 9 and openings 9a during its patching can flow in the direction of the arrows through the refining furnace B into the flue 2b, on the one side, and can be discharged directly through the flue 2a of the furnace A on the other side. The gate valve 18b must be entirely opened, the gate valve 18a may be only partially open, and the pressure required in the hearth chamber may be adjusted by a damper in the chimney flue. The gate valve 18a, however, may remain also entirely closed; in this case the air sucked into the furnace A during its patching, flows over the furnace B and the flue 2b only. The gate valve 18b remains open in any case also when the oxygen blowing in the furnace B begins, and according to the invention is not closed until patching in the furnace A has been terminated.

FIG. 3 illustrates the condition after the reversal. Refining is carried out in furnace B. The scrap or input 17a for the next heat is preheated in furnace A. The flue 2b of furnace B is closed by the gate valve 18b, the flue 2a of furnace A is open. The CO-containing gases of furnace B flow in the direction of the arrow into furnace A, where they are burnt by means of oxygen, or oxygen-enriched air, or air introduced by the nozzle 19a. The waste gases from furnace A flow through flue 2a.

According to the invention, the furnace may be reversed from the state shown in FIG. 1 to the state shown in FIG. 3 when the patching in furnace A has been completed, and is not reversed when the refining and the formation of carbon monoxide or smoke in furnace B begins. Alternatively, the gate valve 18a may be set to the intermediate position shown in FIG. 2.

What is claimed is:

1. A process of refining iron with an oxidizing gas in a double furnace, said furnace comprising two vessels connected in series by a connecting duct, said process comprising refining a ferrous charge with formation of carbon monoxide in one of said vessels, during said refining successively patching the other of said vessels, placing an input into the same and burning carbon monoxide from said one vessel in said other vessel with the aid of a combustion-agent to preheat said input in said other vessel, then tapping said one vessel, charging said other vessel and refining the charge in said other vessel, during said refining successively patching said one vessel, placing an input into the same and burning carbon monoxide from said other vessel in said one vessel with the aid of a combustion-agent to preheat said input in said one vessel, in which process carbon monoxide being formed in the one vessel while the other vessel is being patched is burnt in said one vessel, and the combustion of said carbon monoxide in said one vessel in which it is formed, while the other vessel is being patched, is supported by air which has been sucked in and preheated in the other vessel which is being patched.

2. A process as set forth in claim 1, in which air from said other vessel being patched is discharged on the one side into said one vessel in which carbon monoxide is formed, and on the other side simultaneously into a flue.

References Cited by the Examiner

UNITED STATES PATENTS

| 2,940,744 | 6/1960 | Swenson | 75—43 |
| 3,060,014 | 10/1962 | Aihara | 75—43 |
| 3,231,369 | 1/1966 | Gorlich et al. | 75—46 |

HYLAND BIZOT, *Primary Examiner.*

DAVID L. RECK, *Examiner.*

H. W. TARRING, *Assistant Examiner.*